Aug. 28, 1934.  C. SCHAUM  1,971,466
MACHINE CONTROL
Filed April 1, 1932   3 Sheets-Sheet 2

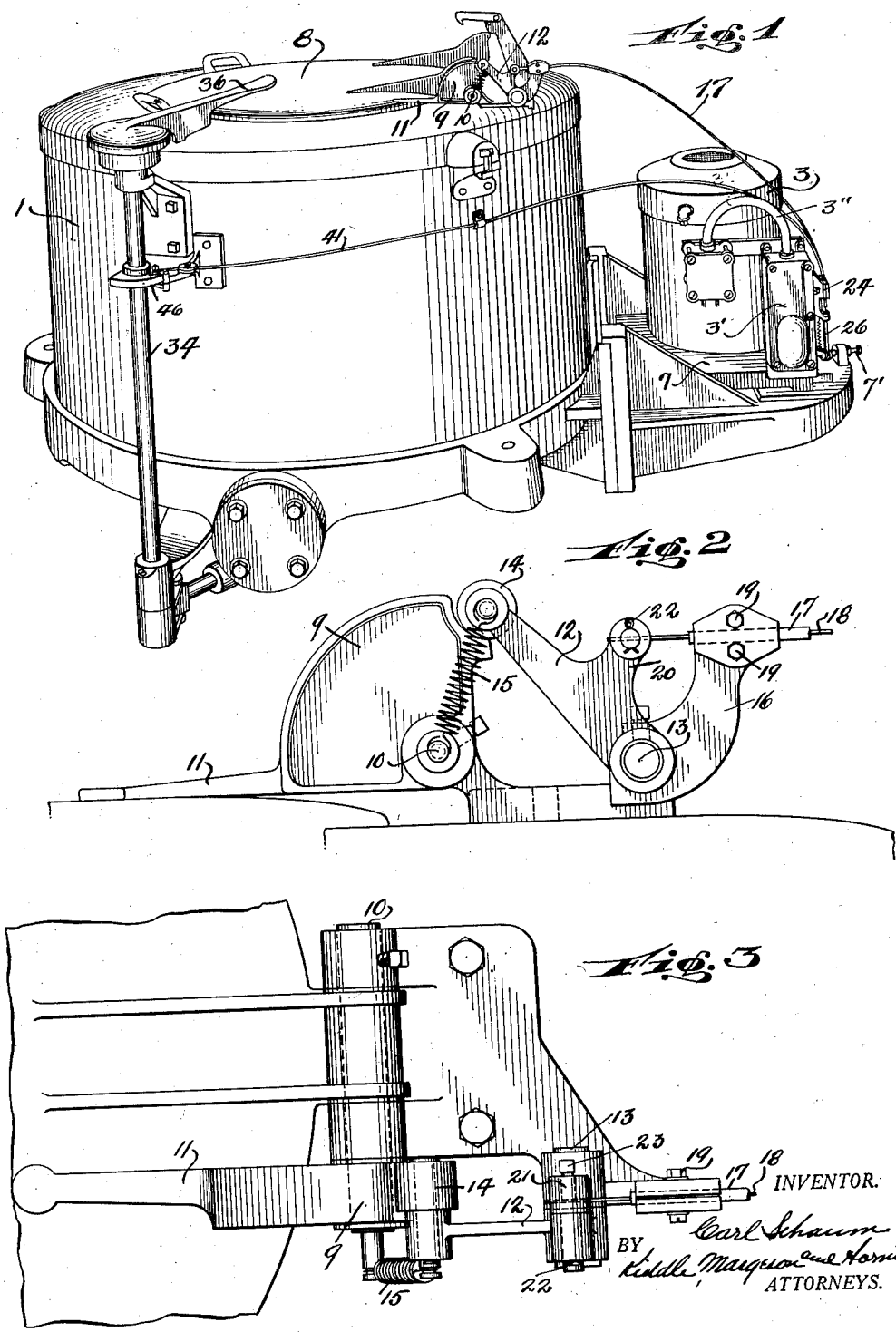

INVENTOR.
Carl Schaum.
BY
ATTORNEYS.

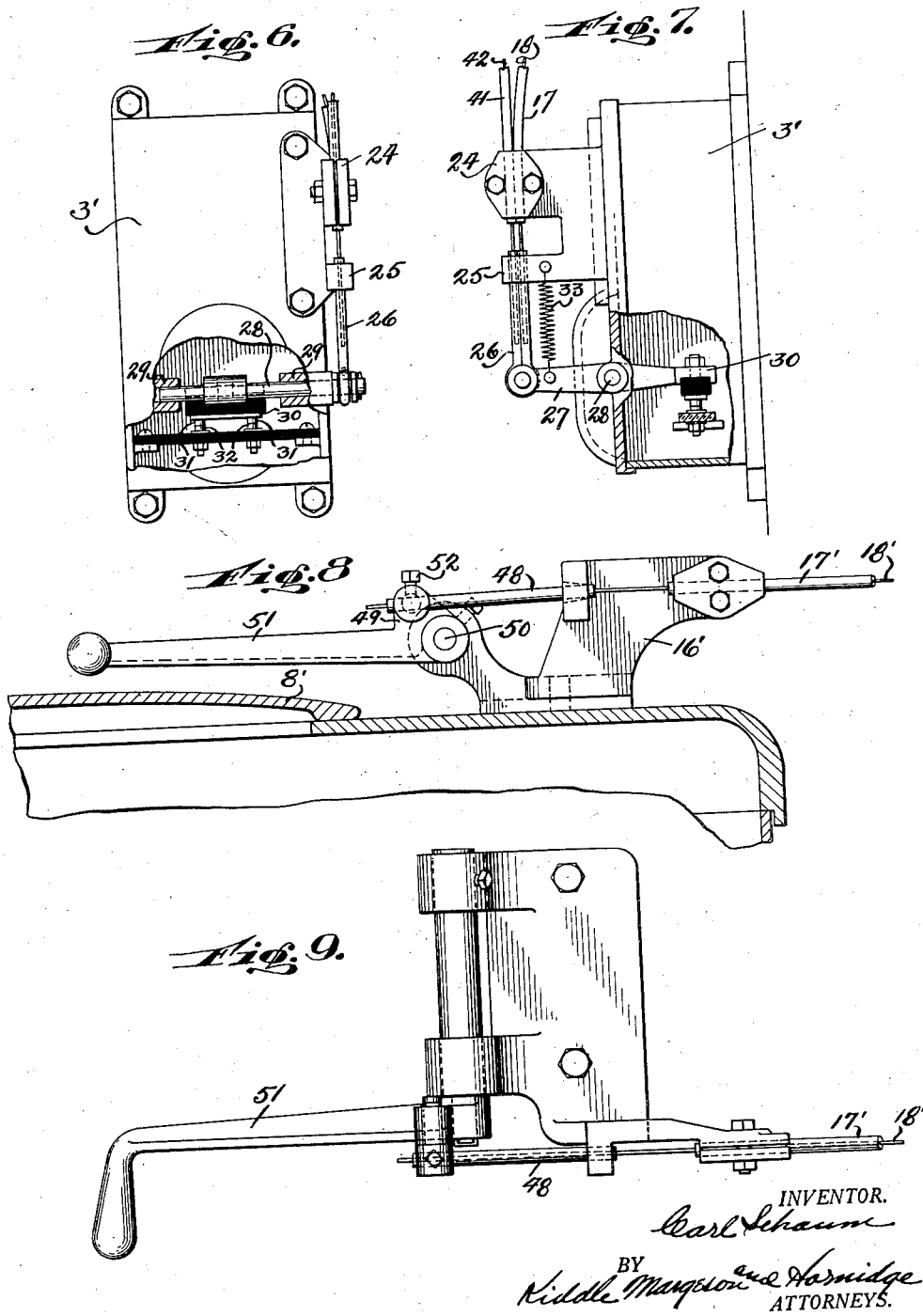

Patented Aug. 28, 1934

1,971,466

UNITED STATES PATENT OFFICE 1,971,466

MACHINE CONTROL

Carl Schaum, Wyncote, Pa., assignor to Fletcher Works, Incorporated, Philadelphia, Pa., a corporation of Pennsylvania Application April 1, 1932, Serial No. 602,448

9 Claims. (Cl. 192—136)

This invention relates to a control for power driven machinery and while the same will be described in connection with the control for motor driven extractors it is to be understood that my apparatus is capable of use in connection with other machines.

One of the objects of my invention is the provision of a control which is simple in construction, efficient in operation and which can be manufactured cheaply.

A further object of my invention is the provision of a control for the power means which is capable of being operated from a plurality of points, more or less widely separated.

A still further object of my invention is the provision of a control of the power means in which an interlocking control is provided between the brake, for instance, of the driven member and a safety device, for example, a safety cover.

A still further object of my invention is the provision of a switch control mechanism adapted for vapor proof and explosion proof motors and wherein the motor is adjustable for belt tightening, etc. Under such conditions of operation it is necessary to have the wiring inside of vapor-tight conduits and this makes it difficult to adjust the motor without disturbing the controls. The present invention provides a control mechanism permitting of adjustment of the motor without disturbing the vapor-tight connections.

In the accompanying drawings:

Fig. 1 is a side elevational view of an embodiment of my invention;

Fig. 2 is an elevational view enlarged with respect to Fig. 1 of that part of the control mechanism which is operated from the safety cover of the machine;

Fig. 3 is a plan view of the apparatus of Fig. 2;

Figs. 6 and 7 are part sectional view of the motor switch mechanism;

Fig. 8 is an elevational view of a modified switch control mechanism; and

Fig. 9 is a plan view of the apparatus of Fig. 8.

Figure 4:
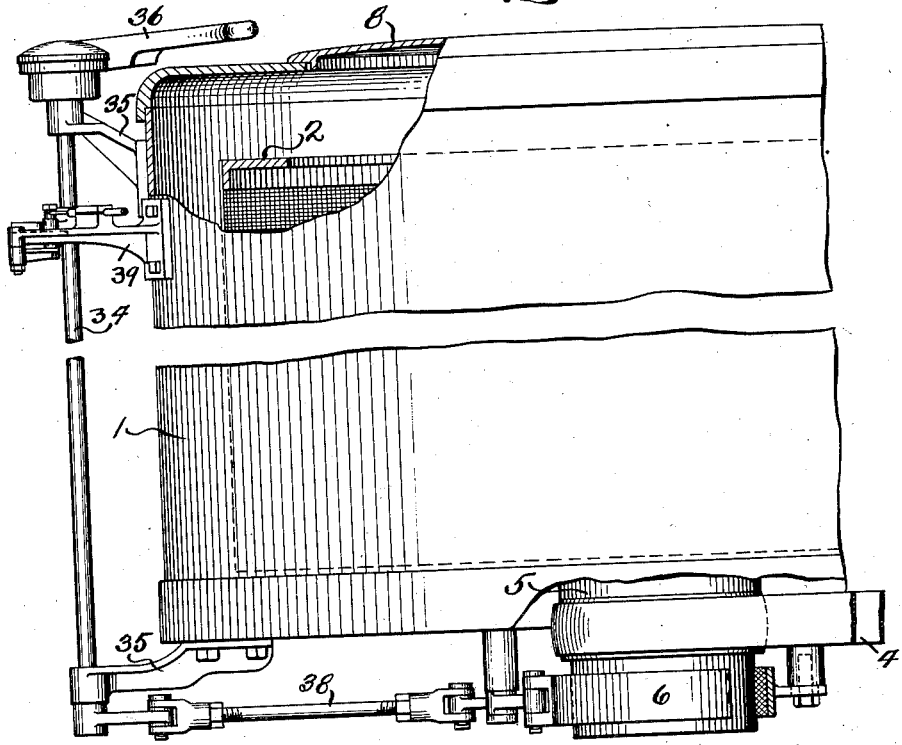
Fig. 4 is another elevational view, partly in section, of part of the apparatus of Fig. 1.

Referring to the drawings in detail, 1 designates a centrifugal extractor comprising a basket 2 which is driven by an electric motor which is mounted in vapor-tight housing 3, this motor driving the basket through a belt 4, for instance, mounted on a pulley carried by the basket spindle 5. The spindle 5 is equipped with a brake designated 6. Inasmuch as the present invention is not directed to the construction of the centrifugal no attempt has been made to show the same in any detail.

The motor and its housing 3, together with vapor-tight switch box 3' are mounted for adjustment as a unit on mount 7, a bolt 7' being employed for effecting the adjustment. This adjustment as will be apparent from the description to follow is effected without disrupting the control mechanism for the motor.

Two controls are provided for the motor, one control being operable when applying the brake and the other being operable from another part of the machine, in this instance from the cover 8. The controls are interlocked to the extent that when the brake is applied the motor circuit is opened and cannot be closed until the brake is released. Likewise the motor circuit is opened when the cover 8 is opened and cannot be closed until the cover is closed. In other words, with the brake applied and/or cover open, motor circuit is held open, the act of applying the brake or opening the cover opening the motor circuit.

Referring first of all to the driving motor control connected with the door or cover 8. 9 designates a cam mounted on the pintle 10 of the cover hinge, this cam being provided with a lever 11 overlying the cover 8 when the latter is in closed position. On the top of the machine adjacent this cam 9 is a lever 12, this lever being pivoted at 13 and carrying a cam follower roller 14 adapted to follow the face of the cam 9.

The lever 12 is provided with a spring 15 adapted to hold the roller 14 in engagement with the face of cam 9.

16 designates a rigidly mounted bracket split at its outer end and drilled to receive tubing 17 for the push wire 18. Bolts 19 clamp the split end of the bracket to the tubing.

The end of the push wire 18 is secured to a projection 20 provided for that purpose on the lever 12. This projection receives a pin 21 held in place by cotter pin 22. This pin is drilled to receive the push wire 18 and is provided with a clamping screw 23 to clamp the push wire rigidly to the pin. This arrangement pivotally attaches the push wire to the lever 12.

The push wire 18, as above noted, passes through a tube 17 which is more or less flexible, down to clamping mechanism 24 secured to the side of the vapor-tight switch box 3', which as before mentioned is rigidly secured to the motor housing 3. Below the clamping mechanism 24 is an extension 25 and mounted for reciprocation in this extension is a link 26 drilled to receive the push wire 18, the lower end of this link being pivotally attached to a lever 27 attached to rod 28 mounted in journals 29 within the switch box 3'. This rod 28 carries a contact arm 30 provided with movable contacts 31 adapted to cooperate with fixed contacts 32 mounted within the switch housing. A spring 33 is attached to the outer end of the lever 27, the other end of this spring being attached to the extension 25 of plate 24.

The contacts 31 and 32 it will be understood are the contacts for controlling the circuit of the driving motor which is mounted within the housing 3 and the necessary leads to the motor are in a rigid vapor proof conduit 3''.

It will be seen from the foregoing that raising of the cover 8 will raise the lever 11 attached to the cam 9 to rock the controlling lever 12 to the right, as viewed in Fig. 1, thereby actuating the push wire 18 to depress the lever 27 to raise the lever 30 and open the circuit of the driving motor at the contacts 31 and 32.

While the cam 9 can be rocked without lifting the cover 8 of the machine, it will be apparent that the circuit of the driving motor will be open at the contacts 31 and 32 whenever the cover 8 of the machine is open, and hence it is impossible to close the circuit of the driving motor unless the cover 8 of the machine is closed.

It will be appreciated also that the motor and its housing may be shifted so as to regulate the tension of the driving belt 4, for instance, or for other reasons without disturbing the operativeness of the control mechanism so far as control of the contacts 31 and 32 through the mechanism just described is concerned.

As above noted one of the objects of this invention is the provision of several controls for the motor circuit operable from separated parts of the machine, and in this connection I shall now describe the control of the contacts 31 and 32 through the brake mechanism, whereby when the brake is applied the circuit of the driving motor is opened and when the brake is released or in off position the movement of the brake to this position closes the motor circuit.

Again referring to the drawings, 34 designates a brake rod extending vertically at the exterior of the machine and adapted to be rotated in brackets 35 secured to the casing or stationary part of the machine. This rod at its upper end is provided with an operating handle 36 by which the rod 34 is rotated. The lower end of the rod 34 through links and levers 38 is adapted to apply or release the brake 6, as the case may be, depending upon the direction of rotation of the rod 34.

Secured to the exterior of the machine intermediate the brackets 35 is a bracket 39 provided with clamping mechanism 40 for clamping tubing 41 thereto, this tubing 41, as will be seen from Fig. 1, extending to the plate 24 of the switch mechanism above described and carrying a push wire 42 the end of which is received by the link 26 also referred to above. The end of the push wire 42 protrudes through the clamping mechanism 40 and is attached to a rod 43 carried by a lever 44 pivoted on the bracket 39, this lever carrying a cam follower 45.

Figure 5:
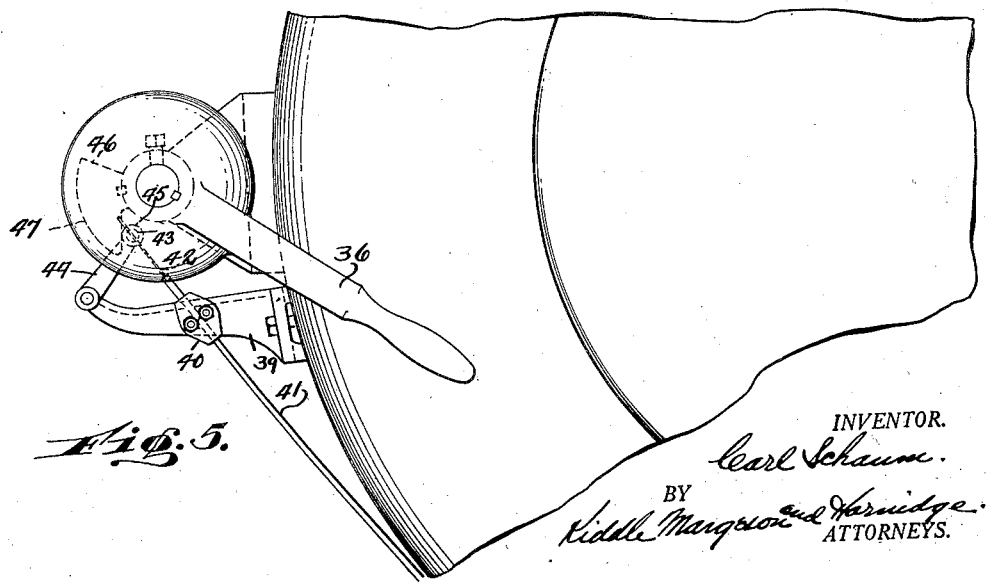
Fig. 5 is a plan view of the control mechanism of Fig. 4.

46 designates a cam adapted to be rotated by rotation of the brake rod 34. The operation of this mechanism, so far as controlling the circuit of the driving motor is concerned, will be apparent from Fig. 5 from which figure it will be seen that when the brake handle 35 is moved counter-clockwise the active part of the cam 46 will move the push wire 42 toward the motor switch mechanism, thereby effecting an opening of the contacts 31 and 32 in the same manner as already described in connection with the operation of these contacts by operation of the cam 9. It will be noticed that the cam 46 is provided with a fairly long dwell 47. Consequently on the initial movement of the brake lever the motor circuit will be opened, but in order to apply the brake it may be necessary to effect further movement of the brake lever, but this further movement will have no effect on the switch mechanism. This provides, therefore, for opening of the motor circuit, before application of the brake, which permits of coasting of the centrifugal basket—a desirable feature. It will be understood of course that the motor circuit will be held open at the contacts 31 and 32 until the brake 6 has been released, the cam 46 holding the motor circuit open.

In this part of my invention, therefore, I have provided a control for the driving motor of the machine whereby in applying the brake the motor circuit is first opened. Inasmuch as the push wire 42 and the push wire 18 are both attached to the same operating lever 27 it will be appreciated that the control of the motor circuit from the brake and from the top of the machine are interlocked in that the brake must be off and the cam 9 in the position shown in Fig. 1 which is the position assumed by the cam with the cover 8 of the machine in closed position, before the motor circuit can be closed. Likewise it is apparent that as long as the cover 8 of the machine is open the motor circuit can not be closed either from the cam 9 or the cam 46.

This is an ideal arrangement in that it permits of the desired operation of a centrifugal extractor, for instance.

The cycle of operation in a centrifugal equipped as above described is as follows: In loading the cover 8 is open and the brake 6 off so as to allow for manual rotation of the basket 2 for convenience in loading. In my apparatus, under these conditions, the motor switch is held open. The cover is then closed and the machine started and run several minutes. The brake lever is then operated which opens the contacts 31 and 32. The machine may be allowed to coast if desired, or the brake lever actuated to apply the brake to stop the basket. After application of the brake, cover 8 may be opened and the brake released to permit of manual rotation of the basket in unloading, the open cover 8 holding the motor circuit open at the contacts 31 and 32.

It will be appreciated that while my control mechanism has been shown as applied to a motor switch the same mechanism can be used where a clutch is substituted for the switch or a belt shifter, without altering the interlocking feature of the two controls.

In Figs. 8 and 9 I have shown a modification of the control mechanism of Fig. 2. Referring to these figures, 16' designates a fixed bracket mounted on the top of the machine and provided with clamping mechanism for clamping the tube 17' which contains the push wire 18'. This wire, it will be understood, passes to the switch mechanism or any other device to be controlled in the same manner as shown in Fig. 1. The bracket 16' provides a bearing for one end of a short tube 48, the other end of this tube being secured to the short arm 49 of a bell crank lever which is pivoted at 50 on the top of the machine and has a long operating arm 51. The bolt 52, it will be understood, clamps the short length of tubing 48 and the push wire 18' to arm 49. The operation of this device is obvious, raising of the lever 51 pushing the wire 18' to the right, as viewed in Fig. 8, to open the motor circuit at the contacts 31 and 32. The arm 51 will overlie the cover 8' of the machine when this construction is employed on a centrifugal, for instance, so that the arm 51 is necessarily raised when the cover 8' is in raised position to insure that the motor circuit is open as long as the cover of the machine is open.

It is to be understood that changes may be made in the details of construction and arrangement of parts above described within the purview of my invention.

What I claim is:—

1. In combination with a power source, power disconnecting mechanism, a machine driven from said power source, a plurality of devices carried by said machine, said devices having predetermined positions when the machine is running, and movable flexible wire connections moved by means at each of said devices to disconnect the machine from said source of power, and to prevent application of power to said machine unless said devices are in their predetermined positions.

2. In combination a machine, a safety cover for said machine, a brake for the machine, brake operating mechanism, a driving motor, a switch for controlling the circuit of said motor, mechanical means operated by application of the brake to open said switch, mechanical means operated by the cover for opening said switch and means operative upon release of said brake and closure of said cover for closing said switch.

3. In combination a machine, a brake therefor, a motor for driving the machine, a switch controlling said motor, brake operating mechanism, a device adjacent the brake operating mechanism and operated thereby, and a push wire extending from said device to said switch, said push wire being actuated to open said switch upon operation of the brake operating mechanism in a direction to apply the brake.

4. In combination a machine, a safety cover therefor, a brake for said machine, brake operating mechanism, a driving motor for the machine, a switch for controlling said motor, a switch control adjacent the cover and operated thereby, a switch control adjacent the brake operating mechanism, a push wire attached to said first mentioned switch control and said switch, a push wire attached to the second mentioned switch control and to said switch, said push wires opening said switch upon movement of the cover toward open position, and upon movement of the brake operating mechanism in a direction to apply the brake, and preventing closure of said switch unless the brake is released and the cover closed.

5. In combination a motor driven machine, a motor, a switch for controlling the circuit of the motor, a plurality of push wires each capable of opening said switch to open the circuit of said motor, a brake for said machine, a cam for moving one of said wires to open said switch when the brake is applied, a safety device, a second cam to move another of said wires to open said switch upon movement of the safety device out of safe position, and means to close said switch, said last mentioned means being inoperative unless the brake is off and said safety device in closed position.

6. In combination a centrifugal machine, a brake therefor, brake operating means, a safety cover for said machine, a motor for driving the machine, a motor switch, a cam connected to the brake operating means, a tube having one end anchored near said cam and its other end anchored near said switch, a wire in said tube and actuated by said cam to operate the switch to disconnect the motor from its source of power, a second cam movable in one direction by the safety cover and in the other direction manually, a second tube having one end anchored near said second cam and its other end anchored near said switch, a wire in the second tube and actuated by actuation of the second cam by the cover to operate said switch to disconnect the motor from its source of power, and means to operate the switch to restore power to the motor only when the brake is in off position and the cover in safe position.

7. In combination a centrifugal machine, an adjustably mounted motor for driving the same, a brake for the centrifugal, a safety cover, a vapor-tight switch connected with vapor-tight connections to the motor outlet box and movable with the motor, a brake, brake operating means, a cam connected to the brake operating means, a wire moved by said cam when the brake operating means is moved from off position and for preventing return of the wire until the brake operating means is moved in the opposite direction, a cover for the machine, a second cam, a second wire moved by the second cam when the cover is moved to open position, said wire being held against movement in the opposite direction until the cover is closed, a single switch adapted to be opened by each of said wires, and means to close said switch, when both wires have been restored to initial position.

8. In combination a machine to be driven, a motor, a driving connection between the motor and machine, a switch for the motor, said motor and switch being rigidly connected, and adjustable as a unit relatively to said machine for adjusting said driving connection and a plurality of stationary control stations from which said switch is mechanically operated.

9. In combination a machine to be driven, an explosion-proof motor, a driving connection between the motor and the machine, an explosion-proof switch for the motor, said motor and switch being rigidly connected with explosion-proof connections and adjustable as a unit relatively to said machine, for adjusting said driving connection, and a plurality of control stations from which said switch is mechanically operated.

CARL SCHAUM.